United States Patent [19]
Grandrud

[11] 3,776,430
[45] Dec. 4, 1973

[54] HOPPER CONSTRUCTION FOR DISPENSERS OF GRANULAR MATERIAL

[76] Inventor: Ebenhard S. Gandrud, P.O. Box 528, Owatonna, Minn. 55060

[22] Filed: Oct. 16, 1972

[21] Appl. No.: 297,655

[52] U.S. Cl. ............................... 222/177, 222/485
[51] Int. Cl. ............................................. A01c 15/08
[58] Field of Search ............... 222/485, 176, 565, 222/483, 486, 177

[56] References Cited
UNITED STATES PATENTS
| | | | |
|---|---|---|---|
| 2,792,970 | 5/1957 | Gaiman | 222/177 X |
| 2,661,125 | 12/1953 | Gandrud | 222/177 |
| 3,470,994 | 10/1969 | Schnell et al. | 222/177 |

Primary Examiner—Stanley H. Tollberg
Attorney—Ralph F. Merchant et al.

[57] ABSTRACT

A hopper bottom wall member and a cooperating gate member for mobile hoppers for dispensing granular material over the ground, the members each having spaced discharge openings of identical size and shape. The gate member is movable in opposite directions to move its openings between positions of full registration with the openings in the bottom wall member and material flow shut-off positions completely out of registration with the openings in the bottom wall member. The bottom wall member is mounted on the hopper for easy removal therefrom and the gate member is mounted on the bottom wall member.

2 Claims, 6 Drawing Figures

PATENTED DEC 4 1973
3,776,430
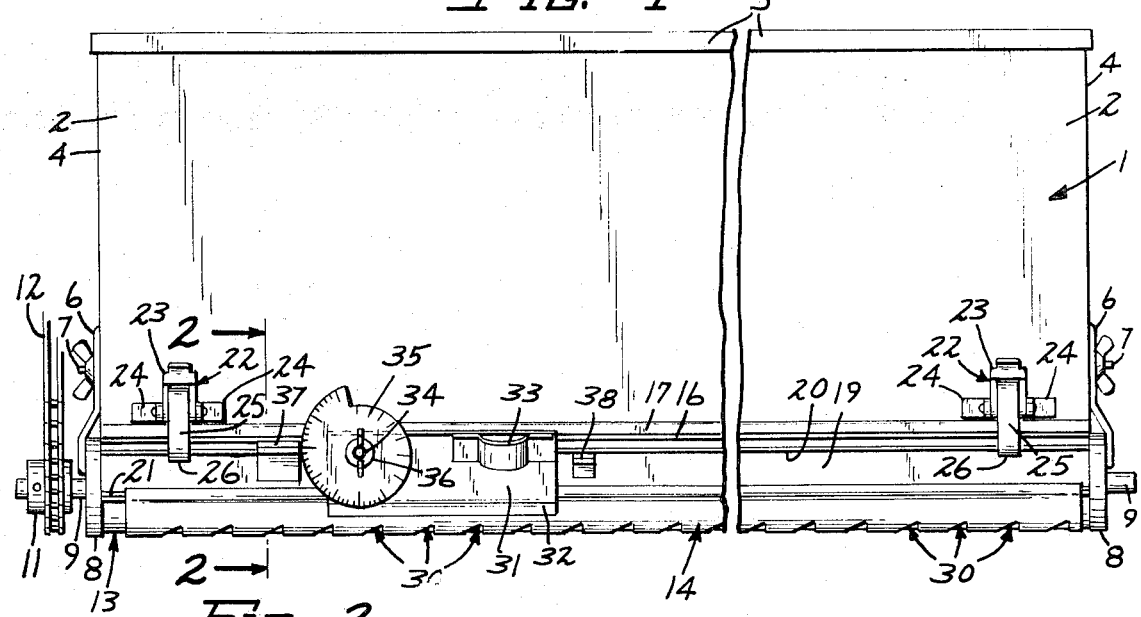
Fig. 1
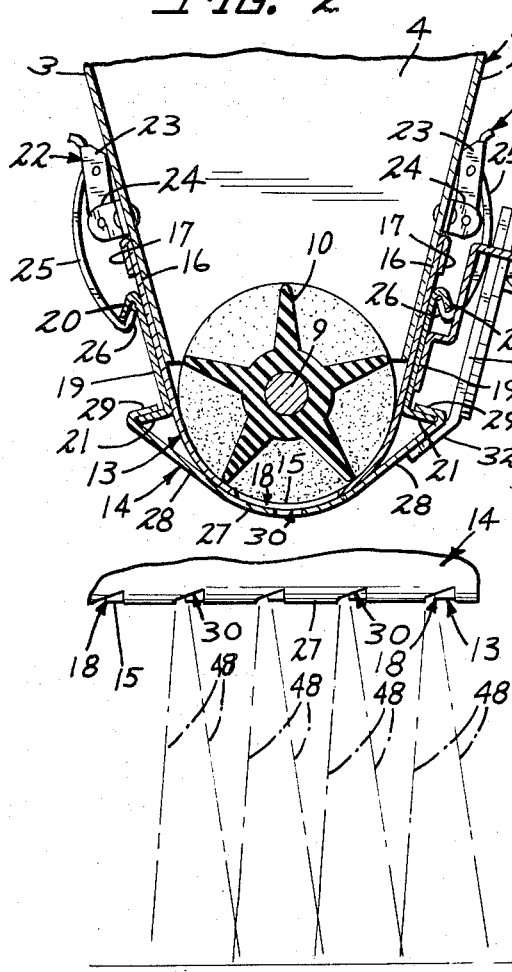
Fig. 2
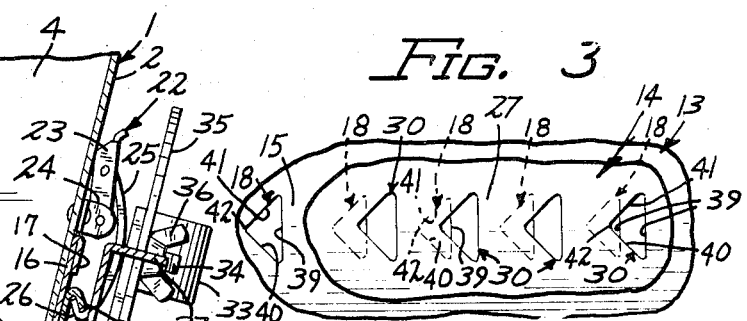
Fig. 3
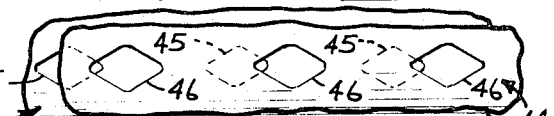
Fig. 5 PRIOR ART
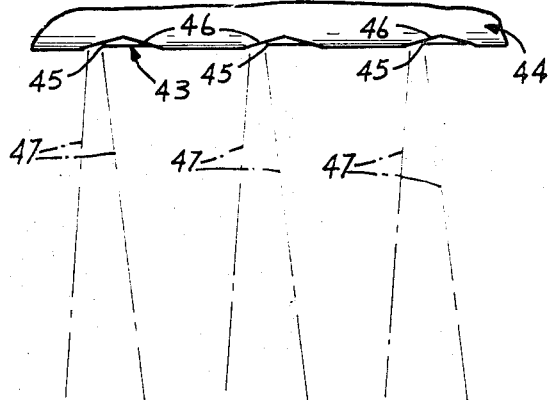
Fig. 6 PRIOR ART
Fig. 4

HOPPER CONSTRUCTION FOR DISPENSERS OF GRANULAR MATERIAL

BACKGROUND OF THE INVENTION

This invention is in the nature of an improvement over dispensing hopper structures of the type disclosed in my prior U. S. Pat. Nos. 2,350,107; 2,630,945; 2,759,637; and 2,848,143, the bottoms and gate members of which have discharge openings relatively movable between positions of full registration and positions completely out of registration. These openings are of generally diamond shape elongated in directions of movement of the gate member. As such, these openings permit extreme accuracy in adjustment of material flow therethrough. However, when the gate members of these structures are moved to provide discharge openings of relatively smaller sizes, material discharged thereto drops to the ground in laterally spaced rows. This is particularly disadvantageous when it is desired to distribute the granular material over the ground in a uniform layer that is continuous from end to end of the hopper.

SUMMARY OF THE INVENTION

An important object of this invention is the provision of a hopper bottom construction for dispensers of granular material which is capable of delivering granular material to the ground in a continuous layer from end to end of an elongated hopper, and at a relatively low rate of flow of material.

Another object of this invention is the provision of a hopper bottom construction which is quickly and easily mounted on or removed from the upper portion of the dispensing hopper.

Yet another object of this invention is the provision of a hopper bottom wall member and gate member having cooperating openings of a shape which provides for close spacing of discharge streams of material from the hopper and for accurate and fine variations in the density or volume of discharge.

To the above ends, I provide a hopper bottom wall member and a cooperating gate member slidably carried by the bottom wall member, the members having discharge openings of identical shape and size. The openings in both members are spaced apart a distance greater than the dimension of each opening longitudinally of the direction of movement of the gate member. Each opening is generally triangular in shape, having one edge extending transversely of the direction of movement of the gate member, and other edges converging from the opposite ends of the one edge and in a direction longitudinally of the direction of movement of the gate member. The bottom wall member has a pair of longitudinally extending anchoring members in its opposite sides, the anchoring members having outwardly projecting upper and lower flanges. Latches attached to the hopper have latch hooks engaging the upper flanges to releasably lock the bottom wall member to the hopper, and the gate member includes a pair of spaced longitudinal flanges overlying the lower flanges of the anchoring members to hold the gate member against the bottom surface of the bottom wall member.

DESCRIPTION OF THE DRAWINGS

FIG. 1 is a fragmentary view in front elevation of a hopper for dispensing granular material, showing the bottom wall and gate member construction of this invention;

FIG. 2 is an enlarged fragmentary transverse section taken substantially on the line 2—2 of FIG. 1;

FIG. 3 is an enlarged fragmentary view in bottom plan of a portion of FIG. 1;

FIG. 4 is an enlarged fragmentary view corresponding to a portion of FIG. 1 and diagrammatically illustrating flow of granular material from the discharge openings of the hopper; and FIGS. 5 and 6 are views corresponding to FIGS. 3 and 4 respectively but showing hopper bottom construction and material flow paths of my prior dispensing hoppers.

DETAILED DESCRIPTION OF THE PREFERRED EMBODIMENT

In FIGS. 1 and 2, an elongated mobile hopper for dispensing granular material is shown as comprising a main hopper body 1 having downwardly converging front and rear or side walls 2 and 3 respectively and generally vertically disposed end walls 4, the open top of the hopper body 1 being normally closed by a cover 5. A pair of bracket elements 6 are secured to the end walls 4 by means of wing nut-equipped screws or studs 7, and serve to mount suitable bearings 8 which journal opposite end portions of a shaft 9 of a feeding rotor 10 contained within the bottom portion of the hopper and extending longitudinally thereof. Means for imparting material feeding rotation to the rotor 10 includes a sprocket wheel 11 pinned or otherwise rigidly secured to one end portion of the rotor shaft 9, and a link chain 12 which is fragmentarily shown in FIG. 1 and which may be assumed to be entrained over suitable rotary driving means, not shown.

The hopper structure, bearings, rotor and driving means, above described, are fully disclosed in one or more of my prior patents, above identified, and in and of themselves, do not comprise the instant invention. Hence, in the interest of brevity, further detailed showing and description thereof is ommitted. It should suffice to state that, in use, the longitudinal dimension of the hopper and axis of the rotor 10 is disposed in a direction transversely of the direction of movement of the hopper.

The hopper bottom of this invention comprises an elongated bottom wall member 13 and a cooperating elongated valve acting gate member 14. The bottom wall member 13 comprises a longitudinally extending upwardly opening arcuate bottom portion 15 and laterally spaced longitudinal side wall portions 16 that diverge upwardly from the arcuate bottom portion 15 and which have opposed inner surfaces that are disposed in face-to-face engagement with outer surfaces of respective ones of the front and rear or side hopper walls 2 and 3. As shown in FIG. 2, the upper edges of the side wall portions 16 are downturned, as indicated at 17, to add stiffening to the side wall portions 16 and provide a smooth upper edge thereto. The arcuate bottom portion 15 of the bottom wall member 13 is pierced to provide a plurality of longitudinally spaced discharge openings 18 for flow of granular material outwardly therethrough from the interior of the hopper.

A pair of elongated, generally channel-shaped, anchoring members 19 are welded or otherwise rigidly secured each to a different one of the upwardly diverging side wall portions 16 and extend longitudinally thereof. The anchoring members 19 have their upper edges downturned to provide longitudinally extending downwardly opening flanges or hooks 20. The lower edges of the anchoring members 19 are outturned to provide laterally outwardly projecting longitudinal flanges 21. Not only do the anchoring members 19 serve to stiffen the upwardly diverging side wall portions 16 but the hooks 20 thereof form a portion of means for releasably locking the bottom wall member 13 in place. Each of the side walls 2 and 3 is provided with a pair of longitudinally spaced latches 22, each thereof comprising a latch lever 23 pivotally mounted on its respective wall 2 and 3 by means of brackets 24, and resilient latch hooks 25 pivotally carried by the latch levers 23 and having upturned lower ends 26 that hookingly engage the downwardly opening hooks 20.

The gate element 14 is formed to provide a cross-sectionally arcuate bottom portion 27 which nestingly receives a part of the arcuate bottom portion 15, upwardly diverging wall or wing portions 28 and inturned longitudinal flanges 29, each flange 29 overlying a different one of the flanges 21 and supporting the intermediate arcuate portion 27 against the arcuate portion 15 of the bottom wall member 13. The gate member 14 is pierced to provide a plurality of longitudinally spaced discharge openings 30 that are identical in number, size, shape and spacing as the discharge openings 18 in the bottom wall member 13.

The gate member 14 is longitudinally slidable with respect to the bottom wall member 13 between one position wherein the openings 30 are in full register with respective ones of the discharge openings 18, and another extreme position wherein the openings 30 are disposed between adjacent ones of the openings 18, so that the openings 18 are closed against discharge of material downwardly from the interior of the hopper. It should here be noted that the spacing between the discharge openings 18 as well as that between the openings 30 is slightly greater than the dimension of each opening 18 or 30 in the direction longitudinally of the members 13 and 14, so that complete closing of the discharge openings can be effected.

For the purpose of imparting sliding movements to the gate member 14 relative to the bottom wall member 13, I provide a plate-like member 31 that is welded or otherwise rigidly secured to the gate member 14, as indicated at 32 and projects generally upwardly therefrom. The plate member 31 is provided adjacent one end with a handle 33, and adjacent its opposite end is provided with a stud 34 on which is pivotally mounted a cam element 35. A wing nut 36 is screw-threaded on the stud 34 to releasably lock the cam 35 in desired positions of rotary movement thereof. The edge of the cam 35 is adapted to abuttingly engage a stop element 37 that projects laterally outwardly from the adjacent anchoring member 19 and side wall portion 16, to limit sliding movement of the gate member 14 in a direction wherein the openings 30 approach full registration with cooperating ones of the discharge openings 18. The adjacent anchoring member 19 is formed to provide a laterally outwardly projecting stop element 38 for engagement with the handle-equipped end of the plate member 31 when the gate member 14 is moved to a position wherein the discharge openings 18 are fully closed by portions of the gate member 14 between the openings 30 therein. The feed rate controlling cam 35 is of the type disclosed in one or more of the above-mentioned U. S. patents.

It will be noted, with reference to FIG. 3, that each of the discharge openings 18 and 30 is of generally right triangular outline, each having an edge portion 39 that extends transversely of the longitudinal dimension of the members 13 and 14 and which may be termed the hypotenuse edge of each triangular opening. Other edges of each opening 18 and 30, indicated at 40 and 41, may be designated as base and altitude edges of each triangular opening, and coverge from the opposite ends of their respective edge 39 in a direction longitudinally of the members 13 and 14. As shown in FIG. 3, an apex portion 42 of each opening 30 moves into register with an overlying one of the openings 18 when the gate member 14 is moved in a direction to cause abutting engagement between the cam 35 and stop element 37. It will be noted, that the positioning of the cam 35 in its rotary movement on the stud 34 determines the amount of overlap between each discharge opening 18 and its respective opening 30.

In FIGS. 5 and 6, a hopper bottom wall member 43 and gate member 44 are shown, these having respective discharge openings 45 and 46 that are diamond shaped. The members 43 and 44 may be assumed to be similar to the members 13 and 14 respectively, the diamond shaped openings 45 and 46 being those of my prior patents above identified. In comparing FIG. 5 to FIG. 3, it will be noted that, when the gate members 14 and 44 are positioned to provide a small overlap of discharge openings with their respective bottom wall members 13 and 43, that the resultant discharge apertures are quite small and spaced at a maximum distance apart. With such spacing of the members 43 and 44, it will be noted that the discharge flow stream of material through each discharge opening, indicated by broken lines 47 in FIG. 6, are so spaced apart that the material is discharged to the ground in laterally spaced rows thereof when the hopper is moved over the ground in its normal operation. With the arrangement shown in FIG. 3, the discharge openings 18 and 30 may each have an area substantially equal to that of each discharge opening 45 and 46. However, the triangular shape and arrangement of the discharge openings 18 and 30 permits the spacing between each opening 18 and each opening 30 to be substantially closer than that between the openings 45 and between the openings 46. The flow of material from the discharge openings in the arrangement illustrated in FIG. 3 is illustrated in FIG. 4, the flow streams being indicated by broken lines 48. It will be noted that, by having the discharge openings more closely spaced, the material discharged through the openings 18 and 30 covers the ground in a continuous uniform layer from end to end of the members 13 and 14. This is particularly advantageous when broadcast seeding or spreading of fertilizer or plant food for broadcast seeded crops.

While I have shown and described a commercial embodiment of my improved hopper bottom construction, it will be understood that the same is capable of modification without departure from the spirit and scope of the invention, as defined in the claims.

I claim:

1. A hopper bottom for a granular material dispensing hopper having spaced side walls and opposite end walls, the side walls having downwardly converging flat lower side wall portions, said hopper bottom comprising:
  a. an elongated bottom member having opposite longitudinal edges, a longitudinally extending cross sectionally arcuate central portion, and upwardly diverging opposite side portions tangential to said arcuate central portion and extending to said side edges, said side portions adjacent the side edges thereof each being disposed in face-to-face engagement with a different one of said hopper side walls;
  b. a pair of laterally outwardly opening channel members extending longitudinally of the bottom member and each having a flat intermediate portion secured to the outer surface of a different one of said opposite side portions and upper and lower laterally outwardly projecting longitudinal flanges;
  c. latches on said hopper side walls engaging the upper flanges to secure the said bottom member to said hopper;
  d. and an elongated gate member having a cross-sectionally arcuate central portion underlying and nestingly engaging the arcuate portion of said bottom member for sliding movements of the gate member longitudinally of the bottom member, and upwardly diverging generally flat side portions projecting tangentially outwardly from said central portion of the gate member, said generally flat side portions having inturned outer longitudinal edges defining flanges each disposed in overlying sliding engagement with the lower flange of a different one of said channel members;
  e. said arcuate portions of the bottom and gate members having longitudinally spaced discharge openings therein, said openings in said gate member being identical in shape, size and spacing to those of said bottom member and movable between full registration with the bottom member openings and fully out of register therewith responsive to longitudinal movement of the gate member relative to the bottom member.

2. The hopper bottom defined in claim 1 in which said longitudinal side edges of the hopper bottom member are folded outwardly and downwardly against their respective side portions to provide stiffening means for said side portions.

* * * * *